Jan. 15, 1946.  G. L. DIMMICK  2,392,978
LIGHT DIVIDER
Filed July 27, 1942
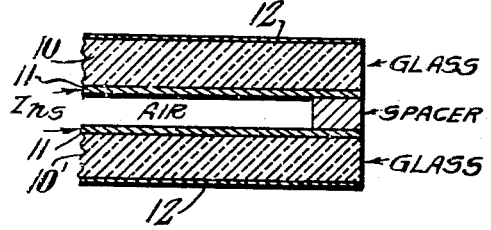
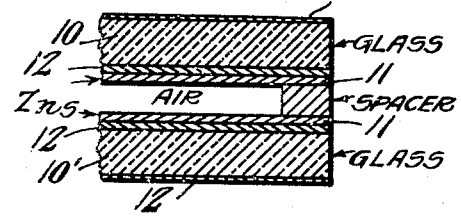
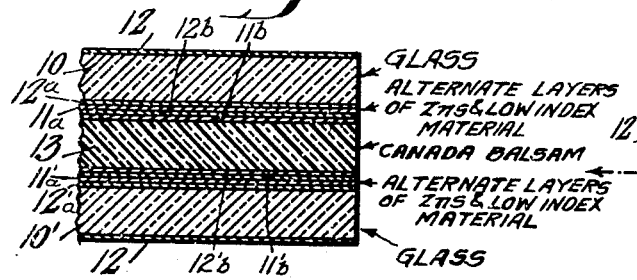
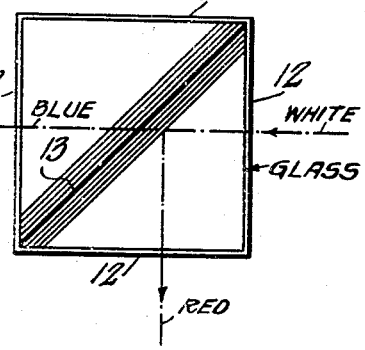
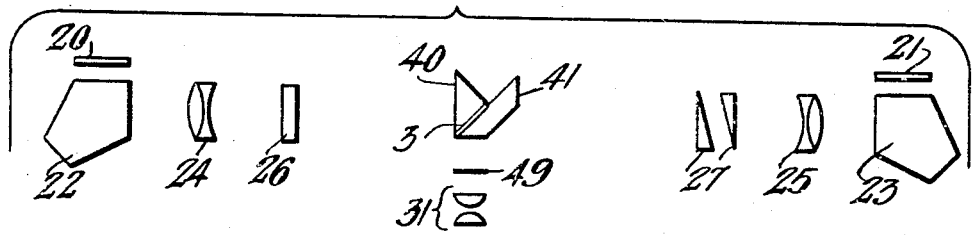
Inventor
Glenn L. Dimmick
By
C. D. Tuska
Attorney Patented Jan. 15, 1946

2,392,978

UNITED STATES PATENT OFFICE 2,392,978

LIGHT DIVIDER

Glenn L. Dimmick, Indianapolis, Ind., assignor to Radio Corporation of America, a corporation of Delaware Application July 27, 1942, Serial No. 452,481

7 Claims. (Cl. 88—1)

This invention relates to an improved optical device for partially transmitting and partially reflecting light with a minimum of light loss. The device involves an arrangement of interference films which may be so selected and arranged as to separate a beam of light either qualitatively or quantitatively according to the type and arrangement of films used.

Heretofore light dividers have customarily used metallized or similarly coated surfaces. The most common type of such surface is the half silvered mirror in which a portion of the incident light is reflected, a portion is transmitted and a considerable portion is absorbed. One objection to the half silvered mirror is that the silver oxidizes readily, or is converted into a sulphide, rapidly decreasing the reflection and increasing the absorption. The absorption of a fresh film of silver which transmits and reflects equally is approximately 30 percent while with all other materials the absorption is greater than this when the transmission and reflection are equal. In the case of metallic films, the color of the transmitted and reflected beams is different and with some materials this difference is quite marked. Aluminum films have been used but such films oxidize and increase in their transparency, the characteristics of the film continuing to change over a period of about six months. Films of gold or platinum do not oxidize but their absorption is high and gold particularly exhibits selective transmission and reflection.

Partially transmitting metal films also have different degrees of reflectivity from the two surfaces. The surface next to the glass gives less reflection than the surface next to the air for the reason that there is a 180 degree difference of phase between the reflection from metal and the reflection from glass to air.

My improved partially transmitting and partially reflecting surface is free of all of the foregoing faults. It has practically no absorption. It is free from color if so desired or may be made color selective if so desired. It is stable and unaffected by air and it has the same reflection from both surfaces. These results are accomplished by using very thin films of material having such thickness and indices of refraction as to accomplish the desired results through the interference of light waves.

One object of the invention is to provide an improved light divider.

Another object of the invention is to provide an improved light divider which will separate a beam of light into two substantially equal and similar beams.

Another object of the invention is to provide a light divider which is capable of separating a beam of light into two similar beams of complementary colors.

Another object of the invention is to provide a light divider which will separate a beam of white light into two beams of white light without color separation.

Another object of the invention is to provide a series of interference films which may be cemented between two pieces of glass while maintaining their light separating properties.

Other and incidental objects of the invention will be apparent to those skilled in the art from a reading of the following specification and an inspection of the accompanying drawing in which:

Figure 1 is a greatly enlarged sectional view of one form of the invention;

Figure 2 is a similarly enlarged sectional view of a second form of the invention;

Figure 3 is a similarly enlarged sectional view of a third form of the invention;

Figure 4 is a plan view of an optical cube embodying the type of film shown in more detail in Fig. 3; and Figure 5 is a plan view of a range finder using a type of film shown in Fig. 3 for combining the two separated images by means of a prism analogous to that shown in Fig. 4.

In the form of the invention shown in Fig. 1, on the one surface of a sheet of glass 10, I evaporate a layer 11 of material having high index of refraction such, for example, as zinc sulphide. If it is desired to make the light divider achromatic this layer may have a thickness of slightly more than one-quarter of a wave length for green light. On one surface of a second sheet of glass 10' I evaporate a similar layer of zinc sulphide 11, but this layer has a thickness of slightly less than one-quarter of a wave length for green light. The zinc sulphide has an index of refraction of 2.1 and this layer on the surface of the glass increases the reflectivity at the surface from 4 percent to 26 percent.

The two films as shown in Fig. 1 are separated by an appropriate spacer which preferably holds the films apart by a distance of the order of 10 wave lengths of green light, any deviation from this value being preferably an increase rather than a decrease in the distance. The outer surfaces of the glass plates are preferably coated with a layer of low index material 12 so as to decrease the reflectivity therefrom. This material may be calcium fluoride, magnesium fluoride or the eutectic mixture of calcium and aluminum fluoride described and claimed in my application, Serial No. 432,836, filed February 28, 1942, now Patent 2,371,611, issued March 20, 1945. This particular arrangement will transmit approximately 55 percent and reflect approximately 45 percent of the incidental light without any color separation.

With the arrangement just described, the tendency for each high index film to be color selective is offset by the equal tendency in the opposite direction by the other film and as a consequence the light is divided without any color separation and with no light loss.

If it is desired to cause a separation of different portions of a spectrum at the reflective surfaces, this may be accomplished by adjusting the thicknesses of the reflecting films accordingly. If the thickness of both of the films is, for example, made a half wave length in the blue-green portion of the spectrum, then the blue end of the spectrum will be predominantly transmitted with the maximum transmission at the wave length for which the film thickness is a half of the wave length and the complementary portions of the spectrum will be reflected. Conversely, if it is desired to transmit the red portion of the spectrum and to predominantly reflect the blue end of the spectrum, the film thickness should be made greater so as to secure maximum transmission in the portion of the spectrum desired. For a mathematical explanation of the operation of such films, see my article entitled "A New Dichroic Reflector and Its Application to Photocell Monitoring Systems" in the Journal of the Society of Motion Picture Engineers for January, 1942, volume XXXVIII, at pages 36 to 44.

In the arrangement shown in Fig. 2, the films are re-arranged so as to reflect more than 45 percent and transmit less than 55 percent of incident light. In this form of the invention, a thin film or layer 12 of material of low index of refraction is applied first to the glass sheets 10 and 10' and thereafter the layers 11 of high index material such as zinc sulphide are applied. These low index films, as indicated by the reference numeral 12, may be of the same material as the outer low index layers 12 which reduce the reflection from the outer layers of the glass. If the thickness of the two low index films 12 is a quarter of a wave length, then the overall reflectivity is about 60 percent and the transmission 40 percent. Any other value between these values and the values given above of reflectivity of 45 percent and transmission of 55 percent may be secured by decreasing the thickness of the low index film by an appropriate amount. In the form of the invention shown in Fig. 2, either an achromatic film may be secured or a color selective film may be secured as described in connection with Fig. 1. For example, if the thickness of the one high index layer is made slightly less than one quarter wave length, it appears slightly blue by reflection and slightly yellow by transmission. Conversely, if the other layer has a thickness slightly greater than one quarter of the wave length, it appears yellow by reflection and slightly blue by transmission. When these layers are placed almost together, the colors balance, thus giving a neutral gray both by transmission and reflection. By spacing the layers at least 10 wave lengths apart, the interference rings which might otherwise be produced by the various colors overlap and cannot be seen by ordinary light or incandescent light.

The foregoing arrangements are satisfactory when it is practical to use an air space between the optical elements. In some instances, however, it is necessary for mechanical reasons for the optical elements to be cemented rigidly together. Since all transparent cement has an index of refraction considerably higher than air, the construction of the films should be modified as shown in Fig. 3, for example, in order to secure adequate reflection and, if desired, proper color separation.

In the construction shown in Fig. 3, the glass sheets 10 and 10' are each provided with a plurality of alternate layers of high index and low index material such as shown in Fig. 2. In the form of the invention as shown in Fig. 3, two pairs of low and high index films are placed on each glass surface so that each surface has a low index layer 12a (or 12'a in the case of the coating on the glass sheet 10'), then a higher index layer 11a or 11'a, then a low index layer 12b or 12'b and then the fourth layer 11b or 11'b of high index material. The two sheets of glass may then be cemented together face to face with appropriate optical cement such as the Canada Balsam 13 as indicated. This layer of cement should be chosen, like the air space in Figs. 1 and 2, to have a thickness of the order of 10 wave lengths of light. It will be apparent that the reflection at the surface joining the high index layer and the Canada Balsam will be considerably less than the corresponding reflection between the high index layer and air in Figs. 1 and 2 and this decrease in surface reflection is compensated for by increasing the number of high and low index layers to a sufficient number. In this form of the invention as in those previously described, the reflection and transmission may be made of similar color characteristics of the film may be made selectively reflective and transmissive as to color.

Fig. 4 shows the application of the multi-layer film of Fig. 3 to an optical cube. The multi-layer films are applied to the hypotenuse faces of two right angled prisms and these faces are then cemented together as shown in Fig. 3. As indicated in Fig. 4, if the films are so made as to be selectively reflective of red light and transmissive of blue light, a beam of white light entering the cube from the right will be divided at the surface, the red-yellow portion of the spectrum being reflected at right angles and the blue portion of the spectrum being transmitted along its original path. One advantage of a color selective optical cube of this type is that the divisioon of the light beam is into two strictly complementary parts without any light loss or selective absorption. If, therefore, a beam of white light enters the cube of Fig. 4 from the right, the red-yellow portion will be reflected in the direction downward on the paper and an observer at this point will see the reflected red-yellow portion of the spectrum. If, at the same time, a beam of white light enters the cube along the line of vision of the observer, the red-yellow portion would be reflected to the left while the complementary blue portion would be transmitted to the vision of the observer. If both beams of white light are of equal intensity, the result will appear to the observer to be white while if the intensity is unequal, the field of vision will appear to be reddish-yellow or bluish-white depending upon which beam has the greater intensity.

With this optical cube as with the other reflectors, the color selective quality of the multiple layer films may be so chosen, as described above in connection with Figs. 2 and 3, that the light transmitted has the same color characteristics as that reflected and the visual effect is a neutral gray. In this case if it is desired to compare the intensity of different field, the comparison is made in the usual manner by comparing adjacent portions of the field of vision but as distinguished from the usual optical cube such as the Lummer-Brodhun cube, where the field areas are defined within the cube, the field areas in connection with my device may be defined by diagrams or stops external to the cube.

It was pointed out above that the relatively high index material used in conjunction with my invention is preferably zinc sulphide, which material has an index of refraction of substantially 2.1, while the low index material referred to above which is preferably a calcium-fluoride, aluminum-fluoride eutectic, has an index of refraction of the order of 1.3. This arrangement is quite effective in the forms of the invention shown in Figs. 2 and 3, and light is transmitted through these films at practically any desired angle with practically no change in color with the angle. However with an optical cube such as shown in Fig. 4 or with any similar device, the angle of view or field angle is limited by the difference in index of refraction of the two materials. The limiting angle is that at which total internal reflection occurs at the diagonal face of the cube. If it is desired to increase the angle of view of the cube, a material of lower index refraction than zinc sulphide may be used so as to increase the angle at which total internal reflection occurs. The substitution of material of lower index than zinc sulphide will of course decrease the reflection in each surface and the number of layers should then be increased in order to maintain the reflection constant.

The use of material of a very high index of refraction, such as $TiO_2$ (N=3.0) will restrict the field angle through the cube so much as to limit greatly its utility, although this material may be satisfactorily used in the achromatic films between two plates.

The application of the invention shown in Fig. 5 is a modification of the range finder described in the application of W. L. Douden, Serial No. 441,093, filed April 30, 1942, now Patent 2,352,777, issued July 4, 1944. The range finder specifically described in said docket used a diagonal beam-combining reflector of the multi-layer film type, but my improved multi-layer film permits the use of a more rigid mechanical construction of the optical parts than that described in the said application.

In the range finder of Fig. 5, the light enters through the usual cover glasses 20 and 21 and is reflected by the usual penti-prisms 22 and 23 into the objectives 24 and 25. A compensator plate 26 is provided and the movable measuring prisms 27, which are illustrated as being of the Barr and Stroud type, are provided. It will be apparent to those skilled in the art that other constructions customary in the art may be substituted, or the construction shown may be modified in any usual or convenient manner. An appropriate eye piece lens 31 is provided and if desired, this may be provided with a reticule as indicated at 49 so that the instrument may be used as a sight as well as a range finder.

The application of my improved selective reflector to this type of instrument is shown in the compound prism 40—41. The prism 40 received the light from the left hand objective of the range finder and reflects it downwardly toward the eyepiece 31. The prism 41 receives light from the right hand objective of the range finder, reflects it first downwardly and then to the left. Between the prisms 40 and 41 there is provided, at 3, a multilayer film similar to that shown in Fig. 3. This film is made color selective so that the image from the one objective appears in one color while the image from the other objective appears in the complementary color. When the deflection prisms are so adjusted as to secure co-incidence of the images, the object will appear in its natural colors while if the two images are almost but not quite in co-incidence, most of the objects will appear in substantially natural colors but with marked color fringes.

I claim as my invention:

1. A light divider including a pair of transparent supports having confronting plane parallel faces spaced apart from each other a distance of the order of ten wave lengths of the light to be divided, each of said faces carrying a transparent interference film of material of higher index of refraction than the supports, the film on one of said faces having a thickness of a quarter wave length of said light plus an increment of said quarter wave length, and the film on the other of said faces having a thickness of said quarter wave length minus said increment, whereby the light reflected and transmitted by said divider is of substantially the same color.

2. A light divider according to claim 1 characterized by the addition of a transparent interference reflection-reducing film on the outer face of each of said supports, each of said films being of material of lower index of refraction than said supports and having a thickness of a quarter of a wave length of said light.

3. A light divider including a pair of transparent supports having confronting plane parallel faces spaced apart from each other a distance of the order of ten wave lengths of the light to be divided, each of said faces carrying a transparent two-layer interference film, the layer immediately adjacent each of said faces being of material of lower index of refraction than said supports and having a thickness of a quarter wave length of said light, the next adjacent layer in each case being of material of higher index of refraction than said supports, one of said high index layers having a thickness of said quarter wave length plus an increment of said quarter wave length, and the other high index layer having a thickness of said quarter wave length minus said increment.

4. A light divider including a pair of transparent supports having confronting plane parallel faces, each of said faces carrying a transparent multi-liayer interference film comprising alternate layers of material having an index of refraction respectively lower and higher than that of said supports, said low index layers each having a thickness of one quarter of the wave length of the light to be divided, the high index layers on one of said faces each having a thickness of said quarter wave length plus an increment of said quarter wave length, and the high index layers on the other of said faces each having a thickness of said quarter wave length minus said increment, said faces being spaced apart from each other a distance of the order of ten wave lengths of said light by transparent optical cement having an index of refraction less than that of said high index layers.

5. A light divider including a pair of transparent prisms having confronting plane parallel hypotenuse faces, each of said faces carrying a transparent multi-layer interference film comprising alternate layers of material having an index of refraction respectively lower and higher than that of said prisms, said low index layers each having a thickness of one quarter of the wave length of the light to be divided, the high index layers on one of said faces each having a thickness of said quarter wave length plus an increment of said quarter wave length, and the high index layers on the other of said faces each having a thickness of said quarter wave length minus said increment, said faces being spaced apart from each other a distance of the order of ten wave lengths of said light by transparent optical cement having an index of refraction less than that of said high index layers.

6. A light divider according to claim 1 wherein said film is of zinc sulphide.

7. A light divider according to claim 3, wherein said high index layer is of zinc sulphide and said low index layer is of magnesium fluoride.

GLENN L. DIMMICK.